United States Patent [19]
Balabon et al.

[11] Patent Number: 5,222,138
[45] Date of Patent: Jun. 22, 1993

[54] REMOTE SIGNATURE RENDERING SYSTEM & APPARATUS

[76] Inventors: Sam D. Balabon, 12901 Metro Pkwy. Ft. Myers, Fla. 33912; Walter Peterson, 4281 Albacore La., Ft. Myers, Fla. 33919

[21] Appl. No.: 926,582
[22] Filed: Aug. 6, 1992
[51] Int. Cl.$^5$ ............................................. H04K 1/00
[52] U.S. Cl. ................................... 380/23; 380/51; 382/3
[58] Field of Search ................ 380/23, 51; 382/3, 13; 179/18

[56] References Cited
U.S. PATENT DOCUMENTS

| | | | |
|---|---|---|---|
| 3,706,850 | 12/1972 | Fisher et al. | 178/18 |
| 3,752,904 | 8/1973 | Waterbury | 379/91 |
| 3,761,877 | 9/1973 | Fernald | 178/18 |
| 3,859,509 | 1/1975 | Dillingham et al. | 340/825.33 |
| 3,896,266 | 7/1975 | Waterbury | 379/91 |
| 3,950,614 | 4/1976 | Anderson et al. | 178/18 |
| 3,985,998 | 10/1976 | Grafton | 340/825.33 |
| 4,008,457 | 2/1977 | Radcliffe, Jr. | 382/3 |
| 4,064,389 | 12/1977 | Patterson | 340/825.34 |
| 4,125,743 | 11/1978 | O'Boyle et al. | 178/18 |
| 4,202,626 | 5/1980 | Mayer, Jr. et al. | 380/23 |
| 4,317,956 | 3/1982 | Torok et al. | 178/18 |
| 4,597,101 | 6/1986 | Kishimoto et al. | 382/3 |
| 4,701,960 | 10/1987 | Scott | 382/3 |
| 4,817,034 | 3/1989 | Hardin, Sr. et al. | 382/13 |
| 5,008,428 | 4/1991 | Cleghorn | 379/93 |
| 5,027,414 | 6/1991 | Hilton | 382/3 |
| 5,051,736 | 9/1991 | Bennett et al. | 178/18 |
| 5,091,975 | 2/1992 | Berger et al. | 382/3 |
| 5,157,726 | 10/1982 | Merkle et al. | 380/23 |

Primary Examiner—Salvatore Cangialosi

[57] ABSTRACT

This invention relates to a remote signature system in which a signatory located at a remote location from the original document can receive a virtual image of the document to be signed and, using an electronic pen or the like, sign the virtual document. Information regarding the signature is then transmitted to the location where the actual document exists and is imprinted upon the document using a plotter or printer incorporated in or associated with the scanner which transmitted the original image. A security enclosure may be used around the scanner/plotter/printer to eliminate the possibility of tampering with the document once the document has been loaded into the system. In order to prevent unauthorized access or reuse of the signature, or the document, information regarding the signature and the document is encrypted prior to transmission or storage in memory.

20 Claims, 2 Drawing Sheets

REMOTE SIGNATURE RENDERING SYSTEM & APPARATUS

BACKGROUND OF THE INVENTION

1. Field of the Invention

This invention relates to a remote transmission system, and more particularly to one which allows for the remote recording of an authorized signature upon a document.

2. Description of the Related Art

A variety of computer transmission schemes are well known in the art, and provide for a transmission of information or documents between remote locations. Such systems typically involve the use of computers and modems along with suitable printing apparatus in order to provide the user with the means of transmitting and viewing documents and the like over conventional telephone lines. While such systems are useful for the purposes intended, the legal, banking, credit card and securities industries often require the use of an actual signature executed by a signatory at a point of purchase or Agreements. The use of such systems as presently exist in the art for transmitting such a signature provide insufficient security and reliability for the direct execution of documents in remote locations.

Often, as a means of overcoming such deficiencies, the parties agree that a telefax copy of the signed document can be provided, with a confirming copy by mail. However, such a system still introduces the delays of originally sending originals, the possibility that they will be lost or damaged, and the costs of transmittal. Thus, such a system is unwieldy and expensive, offering only slight advantages over merely sending and receiving the documents by courier.

One rapidly expanding use of signatures is remote authorization of credit card purchases. Unfortunately, it is often the case that credit card fraud includes inadequate checking of an authorized signature at a point of purchase. Accordingly it would be helpful if such a system could provide for computerized checking of the signature being offered.

While remote writing apparatus are well known and form the subject of a variety of patents, such remote writing systems do not provide the ability to provide direct execution of documents from a remote authorized writer while providing the security that the signature cannot be used for other purposes at a later time. Accordingly, it would be desirable if a signature apparatus were available which allowed for a document to be executed by a signatory from a location remote from the document.

SUMMARY OF THE INVENTION

The present invention provides a remote signature system in which a document at a first location to be signed is scanned and transmitted over computers and modems to create a virtual document to be displayed at the second location for viewing by a signatory. The signatory then executes the virtual document with an electronic pen or the like, with information corresponding to the signature then transmitted over a modem to the first location where the actual document is located, with a plotter, printer or the like faithfully reproducing the signature at the appropriate place on the document. The remote signatory can have the option of using a digitizing pad and affixing the signature to a virtual document or to the execution of a signature in a prescribed place to be affixed in the appropriate position on the actual document at the first location.

While the transmission of information regarding the signature and document may take place over conventional telephone lines, other transmission media, such as direct wired connections, dedicated lines or radio links may be used in conjunction with appropriate transmitters and receivers to accomplish the appropriate transfer of information. The system can include a security sub-system designed to prevent any execution of a signature except during the specific signing process authorized by the signatory at the second location.

The invention contemplates the affixation of a signature or the like to the document. However, the invention also accommodates the modification or augmentation of a document for other purposes, such as editing, alteration, addition of graphics or other types of representations such as fingerprints. Those skilled in the art will recognize that the invention may also make use of a variety of plotter or printing means to reproduce the graphic representations from a remote location upon an original document.

In one preferred embodiment of the invention, a first location includes a scanner, plotter, computer and a modem. The scanner is capable of receiving a document to be scanned and converting the image to digital data corresponding to the document by use of an analog to digital converter. The data is then incorporated into a data base in the computer and sent, utilizing the appropriate protocols, via modems to a second location at which the signatory is located. The first location includes a secure housing at the first location to prevent interference with the signature process, including a writing area defined within the security housing and a stylus support above the writing area. A scanner overlooks the writing area. A computer located in the second location incorporating the signature area provides an interface for displaying the document to be signed and retrieving the signature executed by the signatory with the stylus on the virtual document. The information relating to the signature is then converted to a digital data file and transmitted over modems and telephone lines to the first location, where it is used to plot or print the signature on the appropriate place on the original document. In this preferred embodiment, the computer is also used to retrieve and control the scanning and writing of the signature upon a document to be executed.

In a preferred method according to the invention, the signatory is presented with a virtual image of the document which is to be signed, the virtual image having been transmitted from a remote location via a conventional scanner, modem and display system associated with computers at each end of the transmission means. The signatory then utilizes a stylus over a screen upon which a virtual document is displayed to execute his signature. The computer at the signatory's location captures and encodes the signature for transmission over the transmission means to the computer located adjacent to the document to be executed. A plotter connected to the computer is then utilized to translate that image of the signature to the document. In one preferred embodiment, the signature is executed by a computer pen upon a screen which displays the image of the document to be executed. After the signature process is completed, the scanner and computer at the location of the original document would scan the executed document and send to the computer at the signatory's location a copy of the executed document for future reference. In the preferred embodiment a secure enclosure is provided around the real document(s) in order to prevent unauthorized access to the document(s) or signature process.

In order to provide the appropriate security for such a process, means are provided in both the computers at the document and signatory location to prevent the recordation of signature(s) by unauthorized persons, thus eliminating the possibility of unauthorized use of the signature or document. Optionally, for certain purposes, means may be provided, as part of the security system, to check the signature being offered against a signature in the data base to verify the authenticity of the signature. It is also contemplated that the security system can include encoding and encryption means utilized to prevent unauthorized access to, or tampering with, the signature or document files in the computers. Such encoding or encryption can also be used to prevent interception of the documents or signatures through the transmission means.

From the above, it may be seen that the present invention provides a new and useful method of allowing the execution of remote documents by a signatory, while providing the security and accessibility desirable for such execution. Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENT

The present invention is embodied in a system which includes a scanner/plotter which provides for both the scanning and execution of a document at a first location. The scanner/plotter is connected to a computer and modem which record the images of the document for transmission to a second location and receive an encoded representation of the authorized signature from the second location for transmission to the plotter and execution on the document. At the second location, a modem and computer are provided which interface with a digitizer pad and/or screen upon which a virtual image of the document being scanned is presented and upon which the signatory may execute his signature for transmission to the first location. Included in each computer is a system of security protocols which can prevent the permanent recording of the signature, thus preventing the unauthorized use of the signature for a purpose other than executing the single document provided. Alternatively, the security system may use encryption to provide secure storage of the document for future reference.

Figure 1:
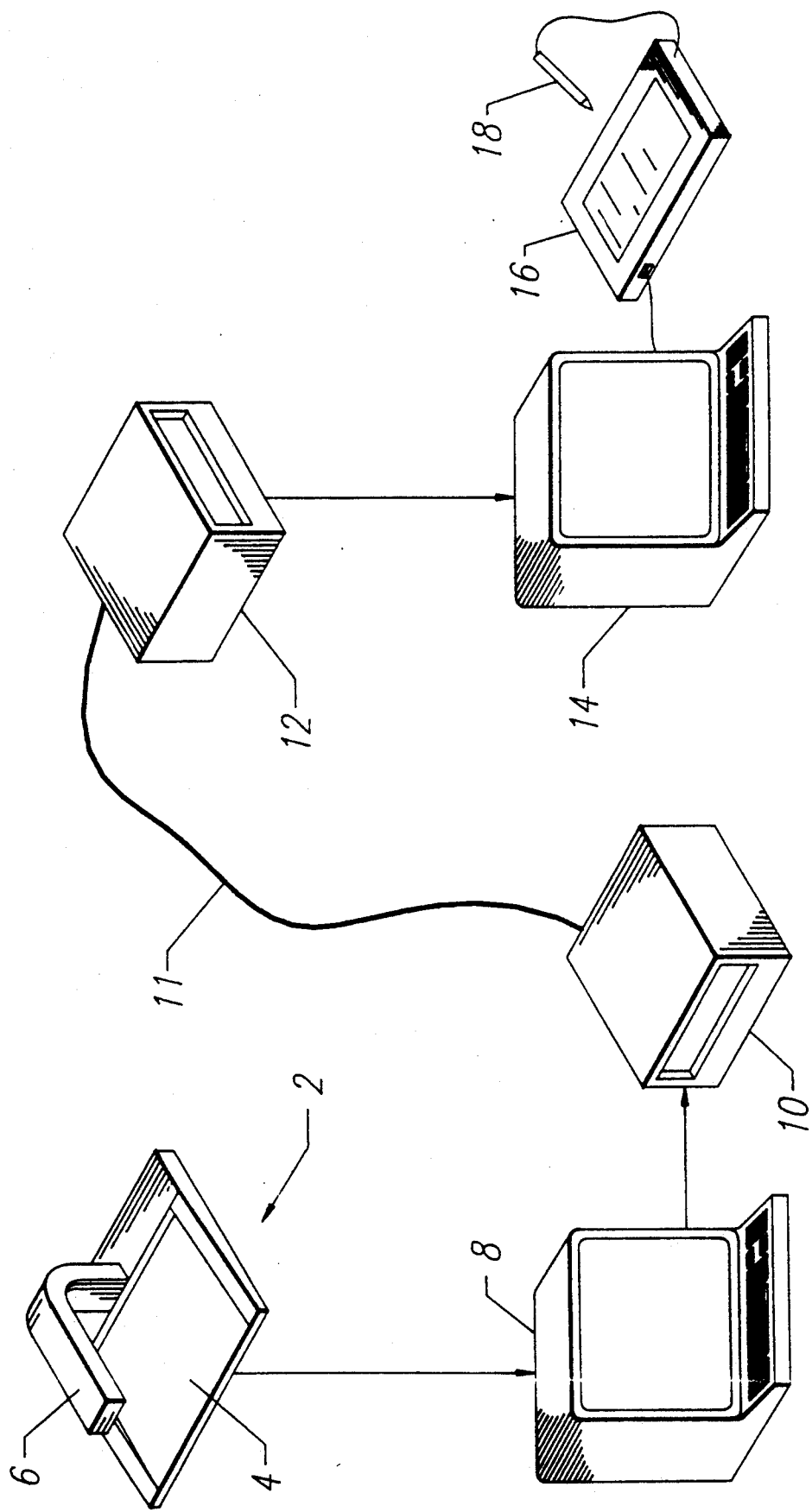
FIG. 1 is a perspective overview of the arrangement of the apparatus of the present invention.

Referring to FIG. 1, a scanner/plotter 2 is illustrated which includes a base plate 4 upon which a document to be executed is placed. Scanner 6 optically scans the document and converts the image to digital information which is transmitted to the computer 8 for transmission by modem 10 over telephone line 11. Computer 8 also includes a security system, not shown, which prevents the recording of the image for any purpose other than transmission to a remote location on the basis of a predetermined protocol preventing unauthorized access. Modem 12 at the signatory's location communicates directly with computer 14 which may include a digitizer pad 16 and associated electronic pen 18. The digitizer pad 16 may also be in the form of a screen display which may be written on by an electronic pen 18. In operation, the document is scanned by the scanner/plotter 2 and transmitted through the computer and modem 10 and 8 over a phone line 11 or other suitable transmission means to the modem at the signatory's location for display by the computer screen. The operator then signs the virtual document produced for transmission back to scanner/plotter 2 so that the scanner/plotter can execute the signature at the appropriate place on the document. The scanner/plotter then scans the completed document once again and transmits it back through the communication paths to the remote computer so that a copy of the executed original may be provided to the signatory.

In one preferred embodiment of the invention, a security system is provided which prevents the unauthorized utilization of either the document, the signature, or both. By the use of such a system, the digitized images of the document and signature are encoded and stored on both computers at the completion of the process either by execution of the operator or termination of the transmission process. Thus, any unauthorized use of the signature or document is prevented while retaining a secure copy of the document at both locations.

Figure 2:
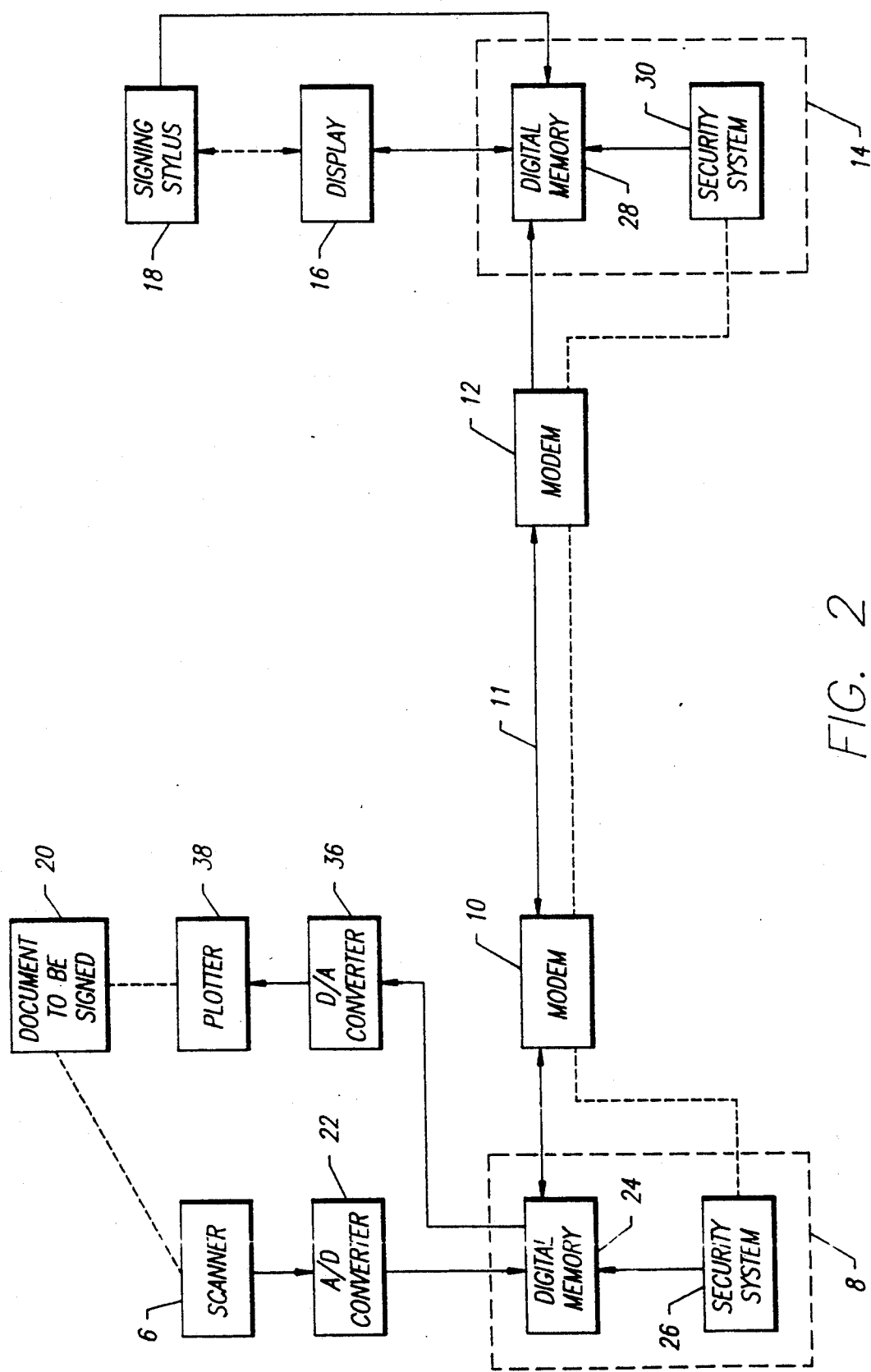
FIG. 2 is a block diagram of the present invention, illustrating the major functional elements of the system.

FIG. 2 illustrates the arrangement of the invention in block diagram form. In this embodiment, a document to be signed 20 is placed before a scanner 6 and is scanned to be converted to a digital file by A/D converter 22. The resultant digital file is stored in digital memory 24 for transmission through modem 10. Security system 26 encodes or otherwise makes secure the digital file representing the document, and transmits protocols regarding the security to the remote location via modem 10. In a preferred embodiment, digital memory 24, security system 26 and their associated software are contained in computer 8.

After the digital file representing the document is sent by modem 10 over conventional telephone line 11 or the like to modem 12, the file is recorded in digital memory 28 in remote computer 14, which also can contain remote security system 30. Security system 30 can preferably contain both means to provide access to the digital file and means to encode a signature for remote transmission. After access to the digital file representing the document is authorized, the file is displayed on display means 32, which may be a CRT or the like with an associated signing stylus 34 or the like. After the signatory signs on the appropriate spot on the virtual image of the display document, the virtual signature is input to the digital memory for transmission via modems 12, 10, to digital memory 24 under the control of security systems 30, 26. Thereafter, upon appropriate authorization from the security systems, the signature is transmitted via D/A converter 36 and signing pen 38 to be imprinted upon the document 20. If appropriate, after the signature is sent, the security system can ascertain that the signature matches a previously confirmed signature in memory. When the process is complete, the security system can restrict access to the files or destroy them, as appropriate.

While the above preferred embodiment has been described in the context of a scanner/plotter at the first location, and an electronic pen and screen display at the second location, the invention also contemplates that other means of scanning and displaying the document may be used, as well as alternative methods to execute the signature and record the final document. For example, documents may be stored in the form of a digital data base corresponding to the document, and transmitted directly from such data base. Additionally, other means of generating documents such as word processing files and the like may be used and modified in order to create a document to be executed. Similarly, at the signatory's location, the document may be displayed by any of a variety of means, including projection display on a video terminal or the like, and the signatory may execute his signature either on an appropriate place on the display document or on an associated pad provided for that purpose. Those skilled in the art will appreciate that a variety of other means of creating and transmitting documents and execution at remote location of signatures for such documents are contemplated by the system.

In a method according to the invention, a document in a first location is converted to a digital data file which is transmitted to a second location and displayed to a signatory located at the second location. The signatory executes a signature upon an associated recording system which then converts the signature to a digital file for transmission to the first location. Thereafter, the digital file is used to imprint the signature upon the original document in the appropriate place. In the method, the digital data file corresponding to the fully executed document is encrypted to allow for storage of confirmatory copies of the files while preventing unauthorized access to them. While the above described methods and apparatus have been described in the context of affixation of a signature by a remote signatory, those skilled in the art will recognize that the invention may also be used for the purpose of otherwise altering, augmenting, or correcting a document. For example, the invention may be used to allow the alteration of documents by interlineation, additional text, initialing of changes, imprinting of fingerprints or stamps or the like with the use of appropriately configured scanners and plotters or printers. Thus, the invention contemplates not only the remote signing of a document, but also the remote alteration or augmentation of a document or graphic representation.

From the above, it will be appreciated that the remote signature apparatus of the present invention allows for the secure and reliable transmission of a signature from a remote signatory for execution of a document in a remote location. The system prevents both unauthorized use of the signature and unnecessary complications and transmission of documents by conventional mail and the like. The invention also allows for the remote alteration or augmentation of a document or graphic representation. While a particular form of the invention has been illustrated and described, it will also be apparent to those skilled in the art that various modifications can be made without departing from the spirit and scope of the invention. Accordingly, it is not intended that the invention be limited except as by the appended claims.

We claim:

1. A method of authorizing and modifying paper documents remotely by a user comprising the steps of:
   inserting first paper document into a scanner/printer;
   scanning said first paper document;
   transmitting the image of said first paper document to a remote computer display;
   displaying the image of said first paper document at the said remote computer display;
   inputting a computer graphics image on to the image of the said first paper document at said remote computer display, said computer graphics image including a manually entered mark by said user;
   transmitting said computer graphics image to the said scanner/printer;
   imprinting the said computer graphics image on to said first paper document using the coordinates of said computer graphics image as said computer graphics image was placed on the image of the remotely displayed said first paper document to produce an authorized and modified first paper document.

2. The method of claim 1 wherein the step of inputting a computer graphics image comprises providing a signature.

3. The method of claim 1 further comprising the step of scanning said authorized and modified first paper document.

4. The method of claim 1 further comprising the step of transmitting a facsimile of said authorized and modified first paper document to said user.

5. The method of claim 1 further comprising the step of printing the facsimile of said authorized and modified first paper document at the location of said user.

6. The method of claim 1 further comprising the step of encrypting the images of said first paper document and the said computer graphics image after inputting of said computer graphics image on to said image of the said first paper document.

7. The method of claim 1 further comprising the step of enclosing the said first paper document, during the method steps, into a security enclosure.

8. The method of claim 1 further comprising the step of providing security means to prevent unauthorized access to the computer files representing said document and said computer graphics image.

9. The method of claim 8 wherein the step of providing said security means comprises the encrypting of said computer files.

10. An apparatus for authorizing and modifying paper documents remotely by a user comprising:
    means for inserting a first paper document into a scanner/printer;
    means for scanning said first paper document to produce an image thereof;
    means for transmitting the image of said first paper document to a remote computer display;
    means for displaying the image of said first paper document at said remote computer display;
    means for inputting a computer graphics image on to the image of said first paper document at said remote computer display, said computer graphics image including a manually entered mark by said user;
    means for transmitting said computer graphics image to said scanner/printer;
    means for imprinting said computer graphics image on to said first paper document using the coordinates of said computer graphics image as said computer graphics image was placed on the image of the remotely displayed first paper document to to produce a authorized and modified first paper document.

11. The apparatus of claim 10 further comprising means for scanning said authorized and modified first paper document.

12. The apparatus of claim 10 further comprising means for transmitting a facsimile of said authorized and modified first paper document to said user.

13. The apparatus of claim 10 further comprising means for printing a facsimile of said authorized and modified first paper document at the location of said user.

14. The apparatus of claim 10 further comprising means for enclosing said first paper document in a security enclosure.

15. The apparatus of claim 10 further comprising security means for preventing unauthorized access to the computer files representing said document and said computer graphics image.

16. The apparatus of claim 15 wherein the security means comprises means for encryption.

17. The apparatus of claim 10, wherein the means for inputting said graphic image comprises a pen input device.

18. The apparatus of claim 10, wherein the means for imprinting said graphic image comprises a laser printing device.

19. The apparatus of claim 10, wherein the means for imprinting said graphic image comprises a plotter printing device.

20. The apparatus of claim 10, wherein the means for inputting said graphic image comprises a computer keyboard.

* * * * *